UNITED STATES PATENT OFFICE.

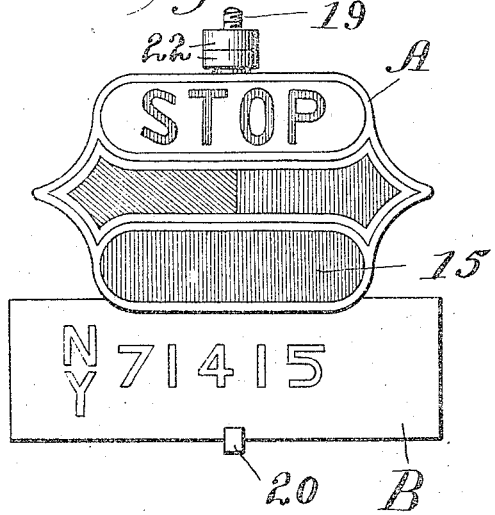
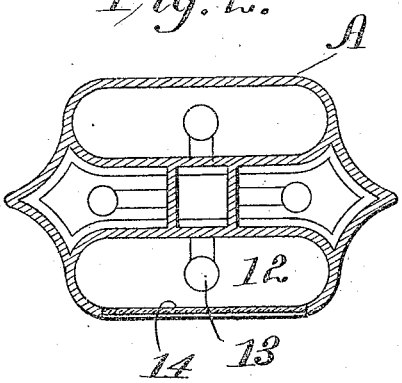
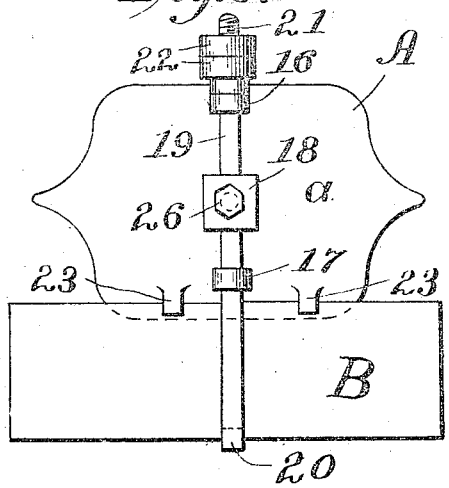
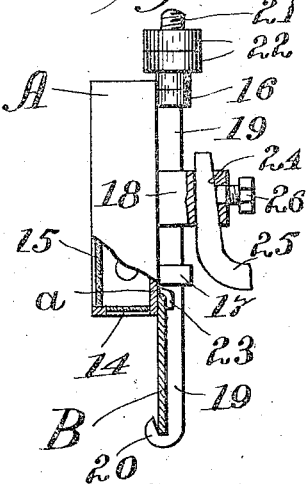

EDWIN T. GRAY AND ALFRED T. HOEVET, OF NEW YORK, N. Y.

COMBINED SIGNAL-BOX AND LICENSE-PLATE HOLDER FOR AUTOMOBILES.

1,201,575.   Specification of Letters Patent.   Patented Oct. 17, 1916.

Application filed August 13, 1914, Serial No. 856,663. Renewed March 14, 1916. Serial No. 84,248.

*To all whom it may concern:*

Be it known that we, EDWIN T. GRAY and ALFRED T. HOEVET, citizens of the United States, residing at New York, in the county and State of New York, have invented a new and useful Combined Signal-Box and License-Plate Holder for Automobiles, of which the following is a full, clear, and exact specification.

This invention relates to automobile signals, and has for its object to provide improved means for attaching a license plate to the signal box, whereby light from the box will be shed upon said plate.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a front elevation of a signal box constructed in accordance with the present invention. Fig. 2 is a longitudinal vertical sectional view of the box, showing how it may be divided into a plurality of compartments for signaling purposes. Fig. 3 is a rear elevation of the signal box with the license plate attached, and Fig. 4 is an end view, the license plate and the lower portion of the box being shown in section.

The signal box A is designed to be attached to the rear of an automobile or other vehicle but is also adapted to be placed at other points on the vehicle if desired. Said box may be divided into a plurality of compartments as illustrated in Fig. 2, each compartment having a separate lamp adapted to be switched on at will for indicating intended movements of the vehicle on which the box is mounted. The lower compartment 12 with its lamp 13 is the only one of the compartments and lamps that coöperates with the license plate and is, therefore, the only one it is necessary to specifically describe in this application. The construction of the signal box for indicating intended turns of the vehicle to the right or left, or that a stop is to be made, is covered in our pending application Serial No. 831,826, filed April 14, 1914.

The bottom of the lower compartment 12 of the signal box is fitted with a clear glass pane 14 while the front face of said compartment has a signal pane 15. The lamp 13 is, therefore, adapted to serve the double function of a signal and a means for illuminating the license plate B which is supported below the box in the following manner: To the rear of the box A, which is closed, as indicated at *a* in Figs. 3 and 4, there are secured two short vertically bored lugs 16 and 17 arranged respectively near the top and bottom of the box, and a long vertically bored lug 18 arranged intermediate of the lugs 16 and 17. The bores of all three lugs are arranged in vertical alinement. A rod 19, having a hook 20 on its lower end and screw threads 21 on its upper end, is passed through the bores of all three lugs and is fitted with lock nuts 22 on its upper end abutting against the upper short lug 16. At either side of said rod and near the lower edge of the box A, downwardly turned lugs or hooks 23 are rigidly secured to the rear of said box. The license plate B is placed above the hook 20 at the lower end of the rod 19, and below the lugs or hooks 23 on the box A, and secured in that position by turning down the nuts 22 against the lug 16, as will be readily understood.

The long lug 18 is provided with a second vertical bore 24 which is preferably tapered, as indicated in Fig. 4, and is adapted to be placed over a suitable bracket 25 on the back of the vehicle. A set screw 26 is provided for clamping the bracket in the bore 24 of the lug 18, whereby the box A and license plate are both held rigidly in place on said bracket. After the box is once attached to the vehicle in the manner described, one license plate may be easily and quickly substituted for another, as when crossing a boundary from one State or country to another, without interfering with the connection to the bracket 25.

Having thus described our invention, what we claim as new and desire to secure by Letters Patent of the United States is:—

1. The combination with a signal box having a light opening in its bottom, spaced downwardly turned hook-shaped lugs on its back near its bottom and a bored lug arranged on the back of the box intermediate of the hook-shaped lugs, of a rod passed through the bored lug and extending below the bottom of the signal box, said rod having on its lower end an upwardly turned hook opposed to said hook-shaped lugs, and means on said rod for locking the rod in place for clamping a license plate between said hook-shaped lugs and said hook and in the field of light from the opening in the bottom of the box.

2. The combination with a signal box, having a light opening in its bottom, spaced downwardly turned hook-shaped lugs on its back near its bottom, and a pair of bored lugs arranged on the back of the box in vertical alinement, the lower one of said bored lugs being located intermediate of the hook-shaped lugs, and the upper one of said lugs being near the top of the box, of a rod passed through the bored lugs and extending below the bottom of the signal box, said rod having an upwardly turned hook on its lower end, and means arranged on the upper end of said rod and projecting into convenient reach above the box for locking the rod in place for clamping a license plate between said hook-shaped lugs and said hook and in the field of light from the opening in the bottom of the box.

3. The combination with a signal box, having a light opening in its bottom, spaced downwardly turned hook-shaped lugs on the back of the box, and a pair of bored lugs arranged in vertical alinement, also on the back of the box, the lower one of said bored lugs being located intermediate of the hook-shaped lugs, and the upper one of said lugs being near the top of the box, of another lug arranged on the back of the box and provided with two parallel bores, one in alinement with the bores in the pair of lugs, a rod passed through the alined bores of all three lugs and extending below the bottom of the signal box, said rod having an upwardly turned hook on its lower end, means arranged on the upper end of said rod and projecting into convenient reach above the box for locking the rod in place to clamp a license plate between said hook-shaped lugs and said hook, and in the field of light from the opening in the bottom of the box, and means for securing a supporting bracket in the second bore of the third bored lug.

In testimony whereof we have signed our names to this specification in the presence of two attesting witnesses.

EDWIN T. GRAY.
ALFRED T. HOEVET.

Witnesses:
HENRY J. MITTAG,
E. STEUERNAGEL.